(No Model.) 9 Sheets—Sheet 1.
C. W. GLIDDEN.
HEEL COMPRESSING AND LOADING MACHINE.

No. 502,667. Patented Aug. 1, 1893.

Witnesses.
Edward F. Allen.
John F. L. Prindlert

Inventor,
Charles W. Glidden,
by Crosby & Gregory
Attys.

(No Model.) C. W. GLIDDEN. 9 Sheets—Sheet 3.
HEEL COMPRESSING AND LOADING MACHINE.
No. 502,667. Patented Aug. 1, 1893.

(No Model.) 9 Sheets—Sheet 4.

C. W. GLIDDEN.
HEEL COMPRESSING AND LOADING MACHINE.

No. 502,667. Patented Aug. 1, 1893.

Witnesses.
Edward F. Allen
John F. C. Prinkert

Inventor:
Charles W. Glidden
by Crosby & Gregory
Attys.

(No Model.) 9 Sheets—Sheet 5.

C. W. GLIDDEN.
HEEL COMPRESSING AND LOADING MACHINE.

No. 502,667. Patented Aug. 1, 1893.

Witnesses.
Edward F. Allen.
John F. C. Frankurt.

Inventor,
Charles W. Glidden
by Crosby & Gregory
attys.

(No Model.)   C. W. GLIDDEN.   9 Sheets—Sheet 6.
HEEL COMPRESSING AND LOADING MACHINE.

No. 502,667.   Patented Aug. 1, 1893.

Witnesses:
Edward F. Allen
John F. G. Prinkert

Inventor:
Charles W. Glidden,
by Crosby & Gregory
Attys.

(No Model.) 9 Sheets—Sheet 9.

C. W. GLIDDEN.
HEEL COMPRESSING AND LOADING MACHINE.

No. 502,667. Patented Aug. 1, 1893.

Witnesses.
Edward F. Allen.
John F. C. ______

Inventor:
Charles W. Glidden
by Crosby & Gregory
attys.

UNITED STATES PATENT OFFICE.

CHARLES W. GLIDDEN, OF LYNN, ASSIGNOR TO JAMES W. BROOKS, TRUSTEE, OF CAMBRIDGE, MASSACHUSETTS.

HEEL COMPRESSING AND LOADING MACHINE.

SPECIFICATION forming part of Letters Patent No. 502,667, dated August 1, 1893.

Application filed May 7, 1892. Serial No. 432,167. (No model.)

*To all whom it may concern:*

Be it known that I, CHARLES W. GLIDDEN, of Lynn, county of Essex, State of Massachusetts, have invented an Improvement in Heel Compressing and Loading Machines, of which the following description, in connection with the accompanying drawings, is a specification, like letters and figures on the drawings representing like parts.

This invention has for its object the production of a machine by which to effectually and rapidly compress a heel blank, and load the same with nails, pricking the blank if necessary, the machine herein represented having automatically operating devices whereby the nails may be fed into a nail box.

The machine to be described performs the several operations in succession on a heel blank, and the parts are so constructed and combined that two or more blanks are being operated upon but differently at substantially the same time or during one and the same rotation of the main shaft, as will be described.

The machine herein described has nail assorting mechanism adapted to deposit nails point first into nail presenting mechanism adapted in turn to present nails point first into nail boxes.

The nail presenting mechanism herein shown is composed of two sets of roadways, one to receive the nails from the nail assorting mechanism, and the other to conduct the nails to the nail box, the first set of roadways referred to being fixed, while the second set is removable or detachable therefrom, so that by substituting between the fixed set and the nail box a removable set of roadways of the proper shape and number, nail boxes having holes arranged in any desired shape may be supplied with nails, the nail boxes differing in the arrangement and number of holes according to the particular heel blank to receive the nails. The nail boxes, two, or it might be more, and mounted upon a movable carrier, are when filled with nails moved automatically into operative relation to a heel blank independently supported below or in the line of movement of suitable drivers.

The jaws for compressing the heel blank are peculiar as to their shape and form, and as to their resultant motions and action on the heel blank, the aim being to compress the heel as a whole against a breast plate, and at the same time provide against any tendency of the said dies to be moved outwardly or laterally away from the heel blank during said operation.

Fig. 3 is a front elevation and section of the machine shown in Fig. 1, behind the line $x$, the nail assorting mechanism being omitted; Fig. 4, a sectional detail of the nail box carrier shaft and its attached gear in the line $x'$, Fig. 3. Fig. 5 is a horizontal sectional detail in the line $x^2$, Fig. 3. Fig. $5^a$ shows the locking plate of the clutch, and part of its holding pawl. Fig. 7 is a horizontal section on the irregular line $x^3$ Figs. 1 and 6. Fig. $7^a$ is a detail in plan view of part of the heel blank feeding mechanism. Fig. $7^b$, shows the lever $E^3$ detached. Fig. $7^c$, shows an under side view of the arm 47 and its toothed plate 46. Fig. 18 is a horizontal section taken through the nail box and its carrier; Fig. 19, a left-hand end view of the nail box shown in Fig. 18. Fig. $19^a$, in elevation, shows the tread block detached. Fig. $19^b$ shows the breast plate detached; Fig. 20, an enlarged detail of the clutch gear supposed to be on the power shaft; Fig. 21, a detail of the cam N; Fig. 22, a development of the cam B.

The frame-work A of any suitable shape to sustain the working parts, has a power shaft $A'$ which may be driven in any usual or suitable manner from any usual or suitable source of power. This shaft has a pinion $A^2$ which engages a gear $A^3$ running loosely on a cam shaft $A^4$, said gear having co-operating with it some suitable sort of clutch preferably of the form known as "Horton clutch," substantially such as represented in United States Patent No. 260,394, the said clutch having a lug, as $A^6$, with which co-operates a releasing lever $A^7$, shown best in Figs. 1 and 20, said gear running loosely on the said shaft so long as the releasing lever acts as a stop for the lug $A^6$, and whenever the releasing lever is turned to free the lug the clutch operates and effects the coupling of the gear $A^3$ to and so as to rotate the cam shaft in unison with it for one rotation, when the lug will be again arrested by the said lever controlled by a spring $A^5$ and the cam shaft be stopped. I have not herein shown the construction in detail of this clutch as it is of common form, and in practice it will be understood that this clutch may be of any usual or suitable construction so long as it will operate in the manner described.

Figures 1, 2:
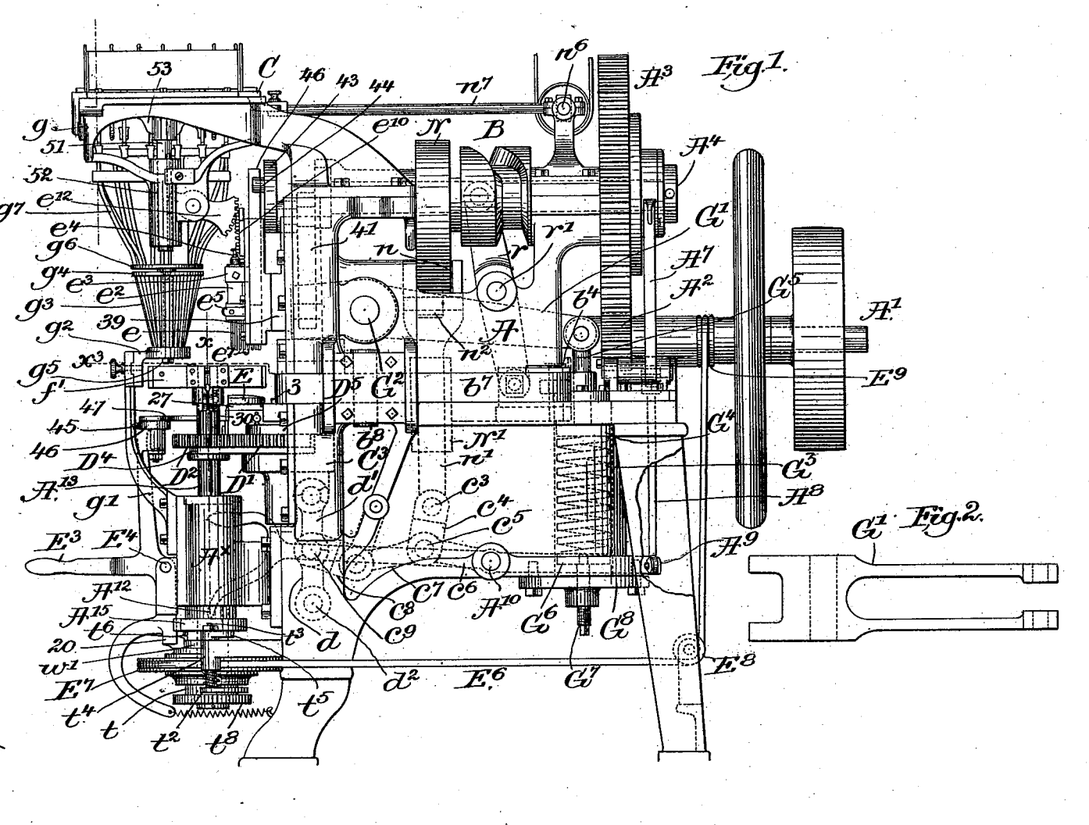
Figure 1, in side elevation, represents a machine embodying my invention, one-half of the tubes $g^7$ and the devices holding them being removed.
Fig. 2 is a plan view of the lever which serves as a yielding abutment for the nail box located at the end of the compressing mold.
Figures 3, 4, 5, 5A:
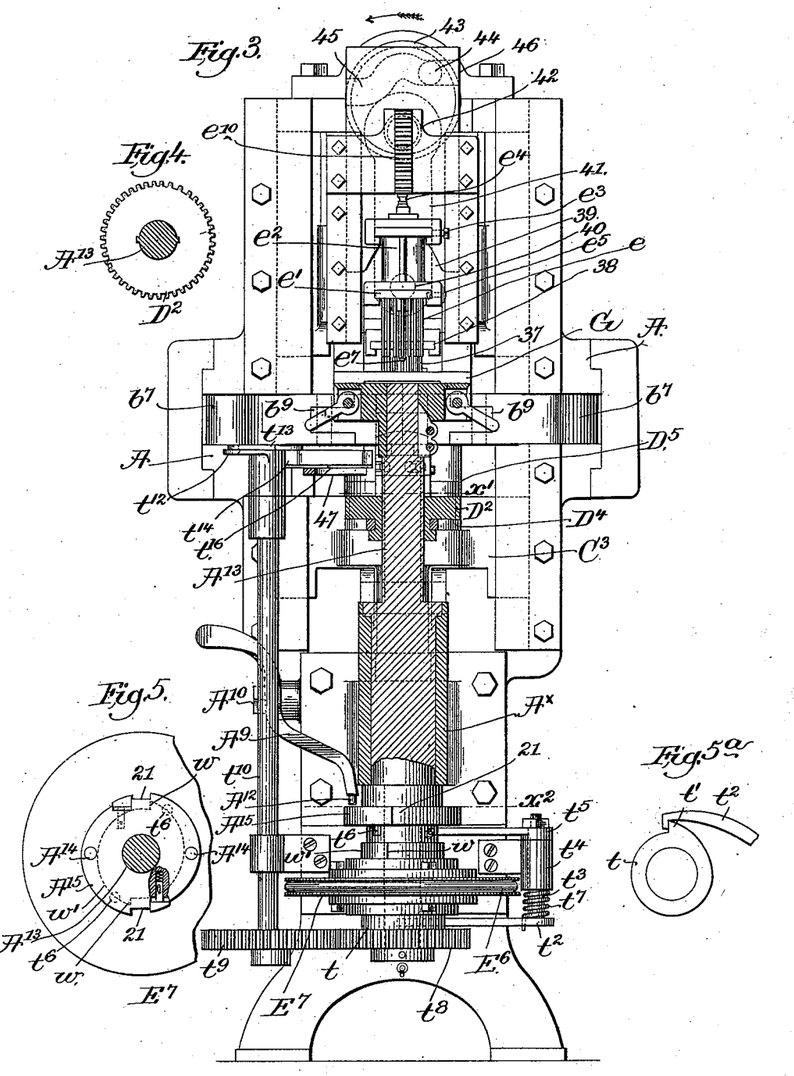

The releasing lever $A^7$ is moved to release the lug by a link $A^8$ attached to it and connected to one end of a lever $A^9$ pivoted at $A^{10}$, the forward end of the said lever being extended to the front of the machine where it is shown in Figs. 1 and 3, as forked to constitute not only a hand piece but also a locking device as $A^{12}$ for the nail box carrier shaft $A^{13}$, so that the said shaft cannot be rotated while the main cam shaft is rotating, the said locking device at such time entering as herein shown, one of the holes $A^{14}$, see Fig. 5, in the locking plate $A^{15}$ fast on the shaft $A^{13}$.

Figures 7, 7A, 7B, 7C:
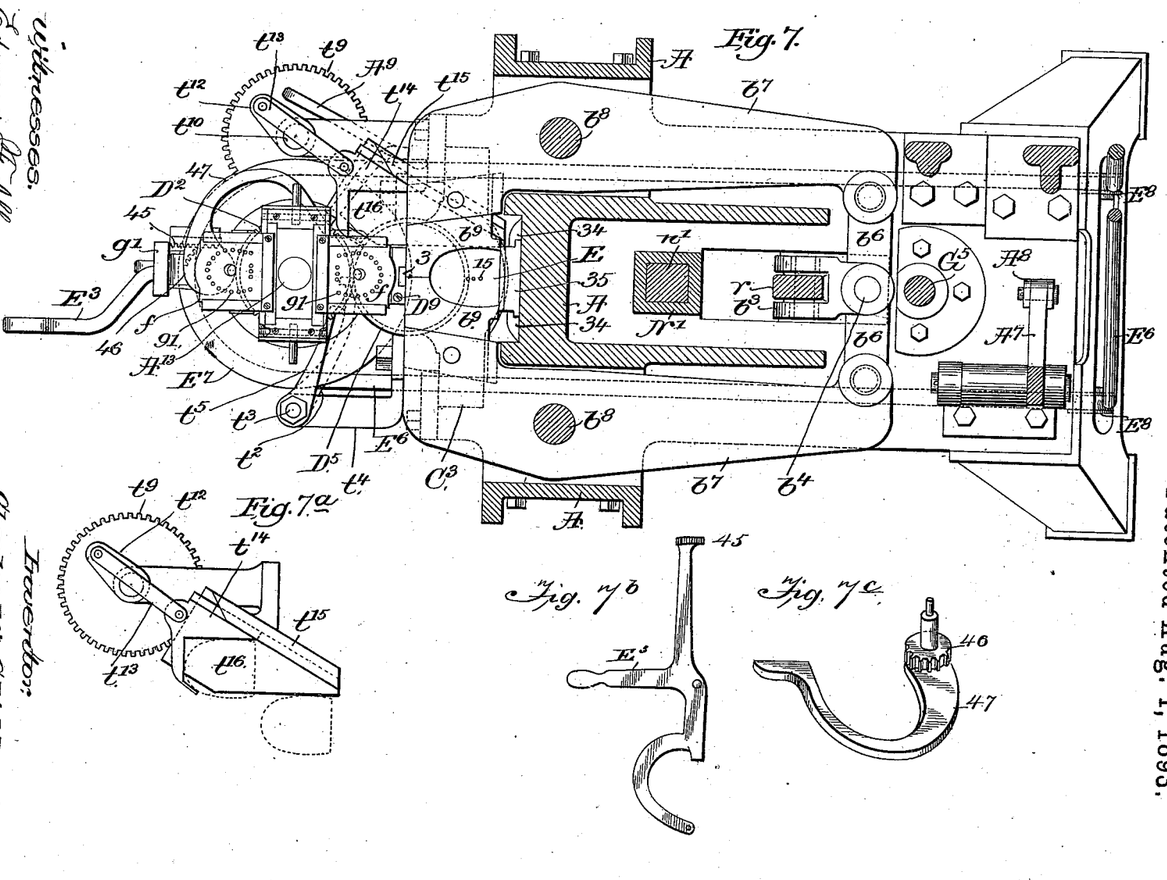
Figures 18, 19, 19A, 19B, 20, 21, 22:
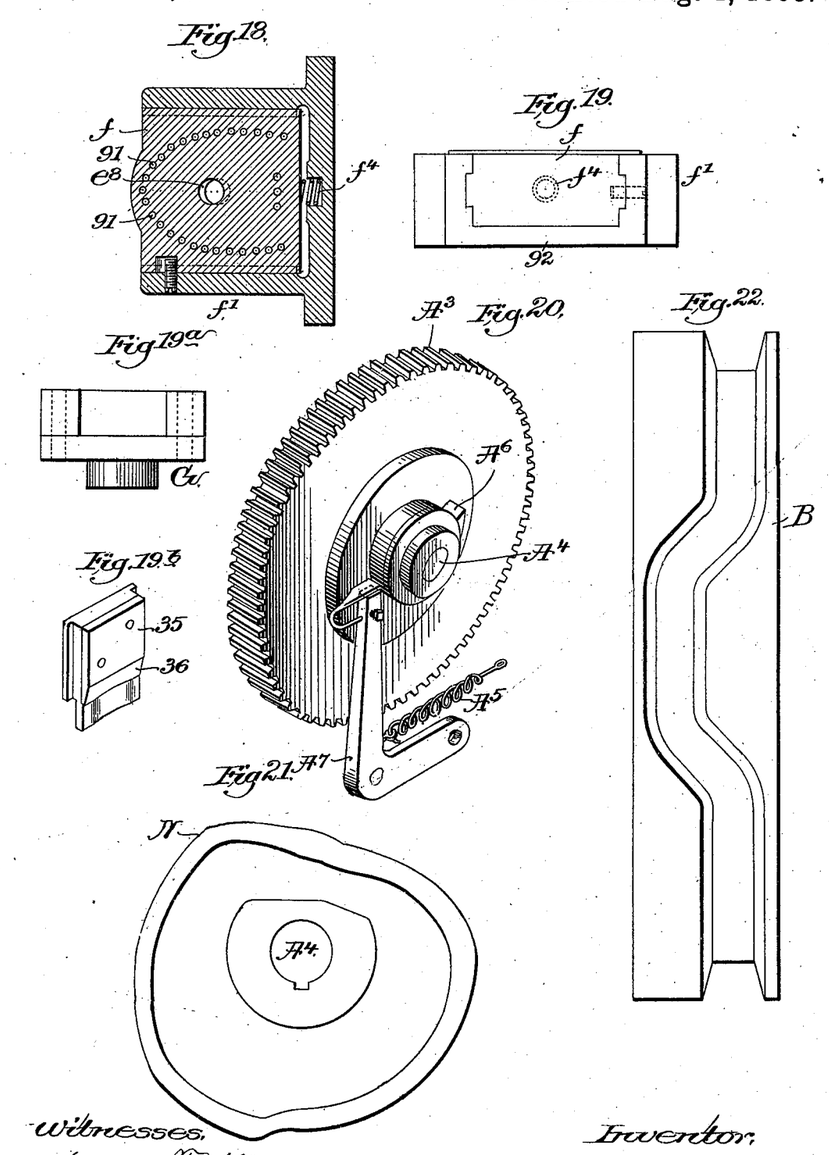

The shaft $A^4$ has a cam B, see Figs. 1 and 22, the groove of which receives a roller or other stud of a lever $r$ pivoted at $r'$, the lower end of said lever as shown best in Figs. 1 and 7 being jointed by pin $b^4$ to a link $b^3$ in turn jointed to two links $b^5$, $b^6$ in turn jointed at their opposite ends to two like mold carriers or compressing devices shown as devices $b^7$, having their fulcra at $b^8$, said devices carrying like mold parts or side pieces $b^9$ which contact with and compress the edges of the heel blanks.

The cam shaft $A^4$ has a cam N, the shape of which is best shown in Fig. 21, and the particular action of which in moving the heel seat mold will be hereinafter described. This cam, as represented, has a flanged periphery of irregular contour, said flange receiving upon its inner side a roller or other stud $n$ connected by a slide bar $n'$ adapted to slide in a guide-way $N'$ represented by dotted lines Fig. 1, said slide having also a second roller or other stud $n^2$ against which rolls the periphery of the cam N, the lower end of said slide bar being pivoted by a pin $c^3$ or otherwise to a link $c^4$ in turn pivoted at $c^5$ to two other links $c^6$, $c^7$, the link $c^6$ having as herein shown its fulcrum on the stud $A^{10}$ before described, the end of the link $c^7$ being represented as jointed to a link $c^8$, in turn jointed at its other end to a pin $c^9$ which constitutes the joint pin of the toggle $d$, $d'$, one end of link $d$ being on a fixed pivot $d^2$ while one end of the other link $d'$ is jointed to the movable bed $C^3$, best shown as enlarged in Fig. 6. The slide bar $n'$, the links $c^4$, $c^6$, $c^7$, $c^8$, constitute one form of actuating mechanism for the toggle $d$, $d'$, referred to, and instead of the particular parts shown and referred to I may employ any other usual or suitable devices to break and straighten the said toggle $d$, $d'$, at the proper times with relation to the operation of the other parts of the machine.

The bed $C^3$ is provided with a vertical opening so that it serves as a bearing for the hollow shank D of a rotating die carrier $D'$. This die carrier shown as made circular, is toothed to be engaged by a spur gear $D^2$ feather-keyed, see Figs. 3 and 4, on the shaft $A^{13}$ so as to be slid vertically on said shaft by or through the action of a notched flange or forked plate $D^4$ carried by or fastened to the bed $C^3$.

Figure 6:
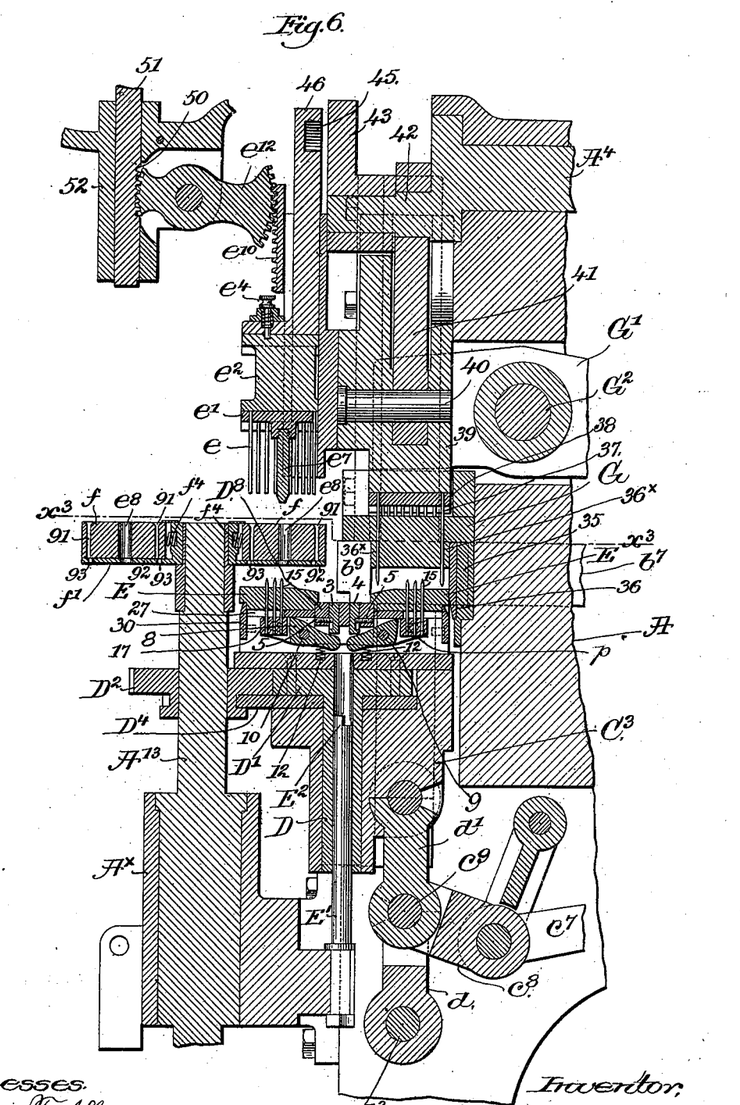
Fig. 6 is a vertical partial longitudinal section through the center of the nail box carrier shaft and some parts at the rear, most of the nail assorting mechanism being omitted.
Figures 8, 9, 10, 11, 12, 13, 14, 15, 16, 17:
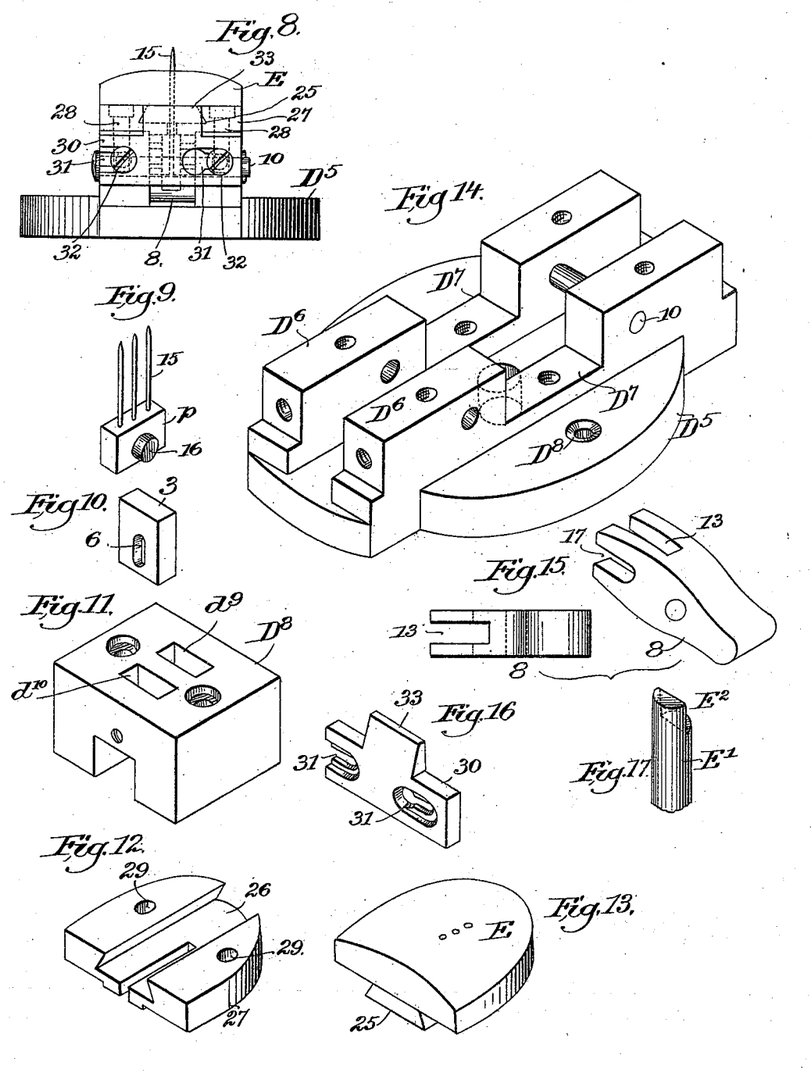
Fig. 8 in elevation, shows the heel seat die removed, it forming part of the heel compressing mold.
Figs. 9 to 16, inclusive, on a larger scale however, show in detail the different pieces shown assembled in Fig. 8.
Fig. 17 shows the shape of the upper end of the rod E'.

The die carrier $D'$ serves as a support for the base $D^5$ of the heel seat die shown best in Figs. 8 to 16, and in section Fig. 6, said base being represented as provided, see Fig. 14, with holes $d^8$ to receive suitable screws shown by dotted lines in Fig. 6, which attach the base to the die carrier or plate so as to partake of its sliding and rotative movements. This base $D^5$ has like uprights $D^6$ notched as at $D^7$, see Fig. 14, to receive a bridge-block $D^8$ adapted to be attached to the base by suitable screws $D^9$, one of which is shown by full lines Fig. 7. The bridge block has two mortises $d^9$, $d^{10}$, which receive respectively like bolts 3, 4, shown in section in Fig. 6, one of said bolts being shown separately in Fig. 10. These bolts have each a suitable slot or pocket 6 to receive one end of a screw 5, see Figs. 6 and 11, which serves to limit the extent of vertical movement of the bolt which it enters, each of said bolts normally resting against the levers 8, 9, mounted on suitable fulcra 10, each lever in turn being acted upon by a suitable spring 12 of a strength sufficient to serve substantially as a counter-balance for the lever. Each lever, one shown in plan view Fig. 15, is forked or suitably shaped at its end, as at 13, to receive and carry a block $p$ provided with impaling pins 15 adapted to be thrust up through the heel seat die E, see Figs. 6 and 13, to enter and hold a heel blank in position while being compressed, &c., as will be described. This block $p$ has a stud 16 at each side which enter slots 17 in the lever 8, see Fig. 15 and also dotted lines Fig. 6.

The hollow stem D of the die carrier or plate slides up and down on a post $E'$ fixed in suitable manner to the frame A, the upper end of the said post, see Figs. 6 and 17, being cut away as at E² to leave a prong, represented as semi-circular in cross section.

In the drawings Fig. 6, the bed C³ is shown in its most elevated or highest position, as when the heel blank has been compressed, and when coming into this position the bolt 4 extended above the bridge D⁸, but the bolt shown abutted against the under side of the side pieces b⁹, before referred to, and the further elevation of the die carrier or plate acted to move the lever 9 in a direction to cause the impaling pins to enter the heel blank at its seat end as represented in Fig. 6. It will be understood, however, that at the previous descent of the die bed the lever 9 was at the left hand side of the center of rotation of the die carrier or plate, viewing Fig. 6, and that during said descent the said lever struck the upper end of the post E', thus moving the lever to withdraw the impaling pins from a heel blank after it had been loaded, and release the same.

While the die carrier or plate is in its elevated position and the heel seat die is elevated as at the right in Fig. 6, the blank is pricked by awls operated as will be described, provided the blank is to be pricked, and thereafter the said die carrier or plate will be lowered, and when lowered will be rotated or moved sidewise from below the compressing dies, the operator for such purpose moving the trip E³ pivoted at E⁴ and having a dog 20, see Fig. 1, thus removing said dog from one of the notches 21 of the locking plate A¹⁵ fast on the shaft A¹³, and at the same time the said dog releases a projection w forming part of a clutch of the Horton class referred to, so that the continuously rotating part E⁷ thereof may be fixed with relation to and rotate the shaft A¹³ half-way around, for in Fig. 5 it will be seen that the plate w' having the shoulder w referred to, has a second stop shoulder opposite it, each striking in succession the dog 20. The part E⁷ is shown as a grooved pulley adapted to receive a belt E⁶ extended over suitable idle pulleys E⁸ and over a pulley E⁹ fast on the said shaft A', said belt being moved continuously from the power shaft A'.

The semi-rotation of the shaft A¹³ by or through the gear D² in engagement with the die carrier or plate toothed at its periphery, see Fig. 1, and rotates the same for one hundred and eighty degrees, thus bringing the bolt 3 above the lever 8 in the position to strike the side pieces b⁹ at the next rise of the die carrier or plate.

With the parts in the position Fig. 6, the descent of the die carrier or plate by breaking the toggle will bring the end of lever 8 in contact with the post E', but the lever 9 will not strike the said post and the lever 8 will be turned to withdraw the impaling pins carried by it from the compressed and loaded heel blank, but the lever 9 not so actuated will remain in the position shown with the impaling pins actuated by that lever in the compressed heel blank, thus holding said blank while the said die carrier or plate is rotated for one hundred and eighty degrees as before described.

Each seat die E has at its lower side a dovetailed rib 25 which enters a dovetailed slot 26 in the holder 27 attached to the uprights D⁶ by screws 28, see dotted lines Fig. 8, in holes 29, see Fig. 12. The heel seat die is kept in place in the holder 27 by the plate 30 having slots 31 for the reception of suitable screws 32, the said plate having a lip 33 which comes opposite the dovetailed rib 25, but to withdraw the heel seat die and substitute another one for it of the desired size and shape, it is only necessary to loosen the screws 32 and slide the plate 30 longitudinally thereon, the slots 31 permitting this.

The frame-work A, see Fig. 7, has guides 34 which receive the breast plate 35 of the mold, said breast plate being shown in vertical section in Fig. 6, and in detail in Fig. 19ᵇ, said breast plate being beveled at 36 so that the breast of the heel lying on the heel seat die, as the latter is lifted from its extreme lower position, the position it occupies when the heel blank is laid on the die preparatory to lifting the same to place the said blank between the side pieces b⁹, acts against the said beveled edge 36 to aid in squaring the heel blank in the die. The upper member of the compressing die is represented as a templet G having movable flanges or projections to rest on the side pieces b⁹, the said templet being shown in section Fig. 6, and separately in Fig. 19ᵃ, but omitted from between the side pieces in Fig. 7. This templet G, see Fig. 6, has a series of holes 36ˣ for the puncturing awls 37 attached to a plate 38 carried by a plunger 39, the plate having upright walls, see Figs. 6 and 19ᵃ, to form a guide-way into which enters the awl plate and awl carrier. This templet G, it will be obvious, for the best results, must be free to yield rather than break under excessive strain due to an excess of leather in the mold, and consequently I have arranged to sustain the said templet by a yielding abutment composed, as herein shown, of a lever G' having its pivot at G² and acted upon by a strong spring G³ which acts against a collar G⁴ of a rod G⁵, the lower end of said spring resting on a washer G⁶ contained in a guide or socket which incloses the said spring, the said washer being acted upon by an adjusting screw G⁷ screwed into a suitable plate G⁸. The short end of the said lever G', see Fig. 2, is to form two arms to bear on the templet G in such manner as not to interfere with the piercing awls. The awl slide 39 for actuating the awls 37 has journaled to it by pin 40 a link 41, said link at its upper end fitting over a crank pin 42 attached to the front end of the cam shaft A⁴. This crank pin at a point beyond the link 41 has fast on it a secondary crank 43, it in practice having a pin 44, shown by dotted lines Fig. 3, as entering a cam slot 45 in a driver bar 46, the said slot being of such shape as to enable an irregular stroke to be given to the driver bar in order that the action of the drivers $e$ may be correctly timed with relation to the times of movement and of rest of the nail-box carrier and other moving parts, or in other words, the driver bar in its movement up has periods of slow speed or rest, and of fast speed but so distributed that it may perform its duties during one rotation of the cam shaft.

The driver bar at its lower end is provided with a driver plate $e'$ which is fitted into a suitable guide-way made vertically movable in unison with the driver bar.

If by accident any part should break and leave the drivers in the nail-box I have provided means whereby the drivers may be lifted independently of the driver bar, and this I have effected by making the driver bar really in two parts, one part as $e^2$ which is carried by the driver bar in its vertical movements and is withdrawable laterally from the main body of the driver bar, and this may be done as stated while the drivers are in the nail-box, and thereafter the driver plate with the drivers may be lifted into the space left by removing the part $e^2$. It will be seen that the part $e^2$, at its upper side has dovetailed flanges or lips to enter suitable guide-ways, see Fig. 3, of the driver bar, the part $e^2$ being held in its adjusted position by a suitable set screw $e^3$.

I have shown the driver bar as provided with a positioning pin $e^4$, see Figs. 3 and 6 preferably spring-controlled and adapted to enter a hole in the part $e^2$ to accurately register it with relation to the driver bar, and the part $e^2$ has a suitable spring pin or latch $e^5$, see Figs. 1 and 3, which enters a hole in the driver plate. This insures accurate registration of the drivers with the holes in the nail-box $f$ to be described. The driver plate has a nail-box actuator $e^7$, shown as a pin having a conical or pointed end to enter a hole $e^8$ in the nail-box. It will be seen that the nail-box provided with a series of nail holes 91, as best represented in Figs. 6 and 18, rests upon the bottom plate 92 of a box carrier $f'$, said bottom plate having, see Fig. 6, a series of holes 93 and a spring $f^4$, the latter acting against the nail-box and serving normally to keep the holes therein (which holes will contain the nails to be driven), out of line with the holes 93 in the said bottom plate when the nail-box actuator is free from the nail-box, but as the drivers approach and are about to enter the holes in the nail-box to act on and drive the nails therefrom and out through the holes in the carrier into the heel blank, the said actuator enters the hole $e^8$ and in so doing, moves the nail-box horizontally until the holes 91 and 93 register or come in line with not only themselves, but also with the drivers, and after this, the drivers enter the holes 91. The plunger 39 in this instance of my invention has a rack $e^{10}$ which in practice moves the sector lever $e^{12}$ to be described forming part of the nail delivery mechanism.

The nail box carrier has, it will be seen, two like nail boxes arranged as here represented diametrically opposite one another, one being in position to have nails supplied to it automatically as will be described, while the other is in position over a heel blank, pierced if desired, to have driven out from the nail box and into such blank the nails previously supplied to the nail box before the semi-rotation of the carrier or table on which it is supported. The lower lever $E^3$ previously described, see Figs. 1, $7^a$ and $7^b$, has at one side near its upper end rack teeth which engage teeth of a toothed plate 46 provided with an arm 47 constituting a heel ejector, and moves said arm and causes it to act against the side of and eject a loaded heel from the heel seat die when the die plate is in its depressed position. The toothed plate is attached to a stud 460, see Fig. $7^c$, which enters loosely a hole in an ear 461, see Fig. 1, forming part of the stand or upright $g'$.

The frame-work has a suitable arm or bracket $g$ which supports the nail assorting and presenting mechanism to be described which is intended as an improvement on the mechanism shown and described in United States Patent No. 464,196, granted to me on the 1st day of December, 1891.

In the present drawings the bearing $A^\times$ fixed to the frame-work has a stand $g'$ which at its upper end supports in a detachable manner a guide-tube foot $g^2$, it receiving and holding the lower ends of the movable set of roadways $g^3$, the upper ends of the said roadways being held in a second plate $g^4$, herein shown as connected to the foot $g^2$ by a suitable bolt $g^5$, such construction enabling the roadways $g^3$ as a whole to be removed from below the plate $g^6$ holding the lower ends of the stationary roadways according to the particular shape of the holes in the nail-box to be filled. The plate $g^6$ shown as made in two sections, has rising from it the stationary roadways $g^7$ of the nail directing mechanism, each roadway having a suitable funnel $g^8$, see Fig. 23. Each plate $g^6$ forms part of a detachable frame, the other parts of which are marked $g^{12}$, $g^{13}$, the parts $g^{13}$ supporting the upper ends of the roadways $g^7$ while the parts $g^{12}$ serve to receive through them bolts $g^{14}$. It will however be understood that this invention is not limited to the particular construction of the means for supporting the roadways $g^7$ so long as they are so supported as to be stationary and enable the roadways $g^3$ to be readily removed from below them.

Figure 24:
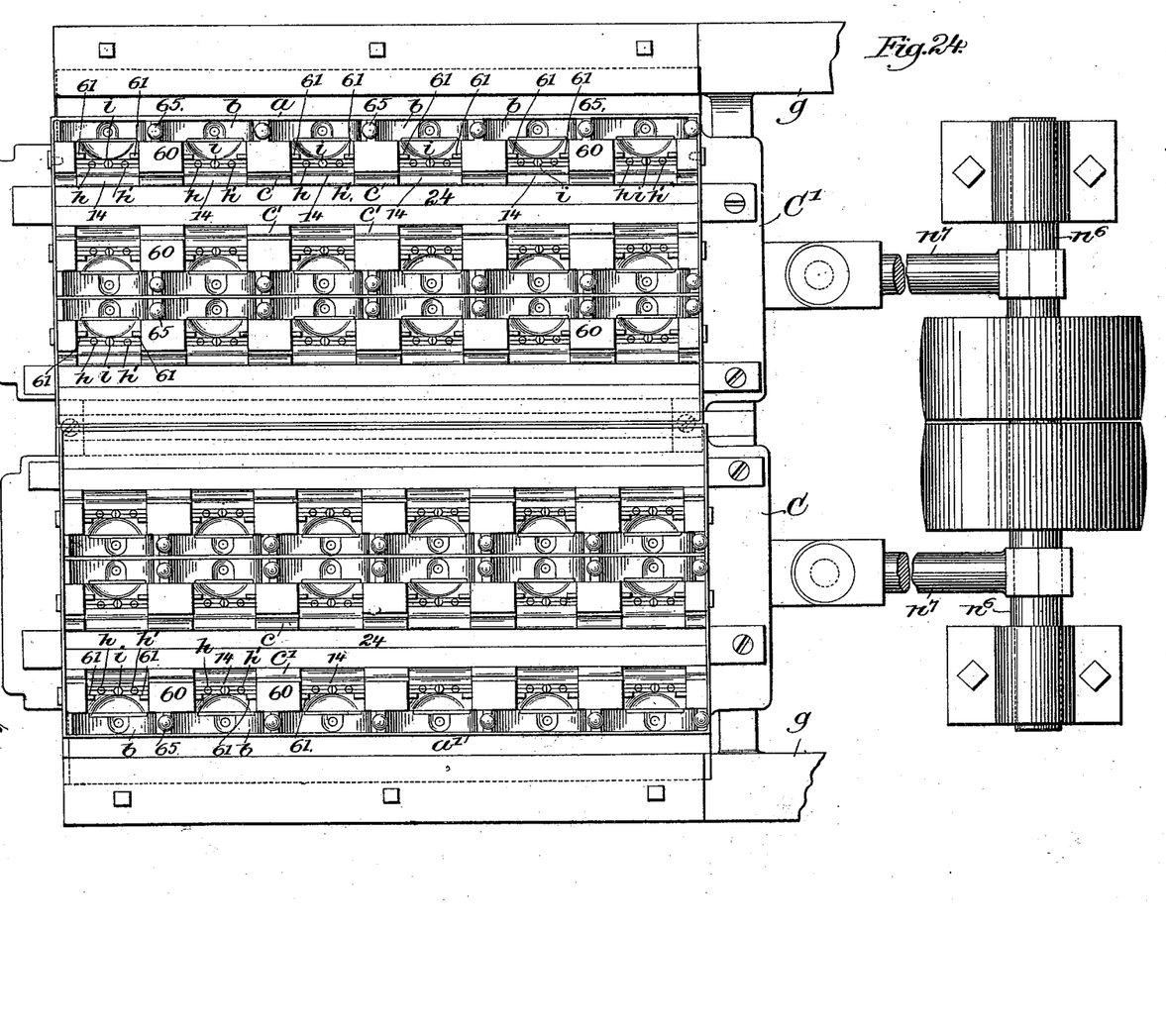
Fig. 24, an enlarged top or plan view of the nail assorting mechanism and its actuating shaft, the figure being broken out to save space on the drawing.

Referring now to Figs. 1 and 24, I will describe the nail assorting mechanism, and in said figures $n^6$ represents a shaft provided with two opposite cranks embraced by connecting rods $n^7$ attached to sliding tables C, C', the said shaft having suitable fast and loose pulleys $n^8$, $n^9$, adapted to receive a belt driven from some suitable counter-shaft or source of motion. These tables C, C', the wells 24, uprights $a$, $a'$, having pools 14, the elevators $c'$, $c'$, the sources $b$, $b'$, adapted to be fed from the pools, and the lifters $h$, $h'$, are all substantially as the like parts in my said Patent No. 464,196, so they do not need to be herein specifically described.

Figure 23:
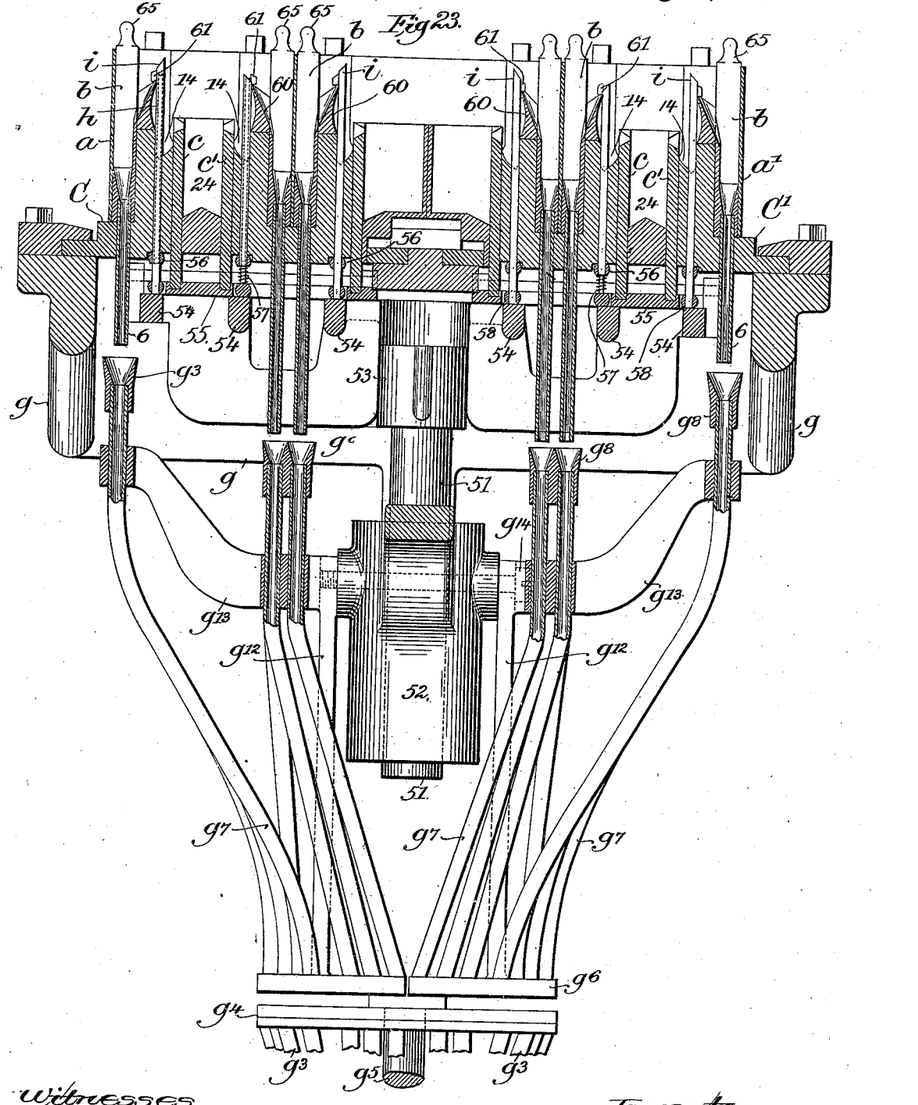
Fig. 23 is a vertical transverse section of the nail assorting and delivery apparatus on a large scale.
Figure 29:
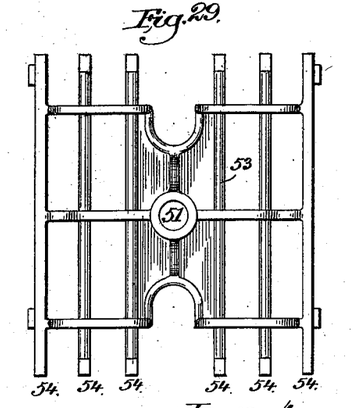
Fig. 29 shows an under side view of the spider.

The segment-lever $e^{12}$ referred to, see Fig. 6, has teeth at its inner end which engage teeth 50 of a rod 51 fitted to slide in a stationary guiding sleeve 52 depending from the frame $g$ and mortised to receive the toothed end of the said segment lever, said rod having at its upper end a spider 53 shown in section and enlarged in Fig. 23 and separately in under side view Fig. 29, said spider having several parallel bars 54 with spaces between. The bars of the spider support loosely upon them a series of plates 55, to which is secured the series of elevators $c$, $c'$, common to said patent, which elevators act to lift the nails from the wells and put them into the pools 14. Each pool has openings at its bottom which receive the lifters $h$, $h'$, and discharging devices $i$, the said devices being substantially as in my said patent.

The present drawings show an extra lifter against which the discharging device rests in its vertical movements, this slight variation in construction merely enabling an extra support to be had for the nails near the discharging device. The lifters $h$, $h'$, are in this instance shown as carried by a bar 56, supported by springs 57 resting on a bar 58, from which rise the discharging devices $i$ beveled at their upper ends as shown in said patent, the bevels being, at the sides of the said lifting devices, said lifters discharging the nails lifted singly by them into the sources 65. The bars 58 have screwed into them screws 59 which serve not only as guides and to also support the springs 57, but the heads of the screws serve as limiting stops to limit the upward movement of the bar 56 carrying the lifters. The two bars 56, 58, are thus normally kept apart by the force of the springs 57. When the spider is in its depressed or lowest position, all the lifters as well as the discharging devices have their upper ends substantially flush with or below the bottoms of the pools, and as the spider is lifted, the lifters and the discharging devices rise in unison through the bottoms of the pools and elevate with them and keep in substantially horizontal position a nail, the upper ends of the lifters being notched preferably as in said patent to better enable them to carry up a nail.

Figure 27:
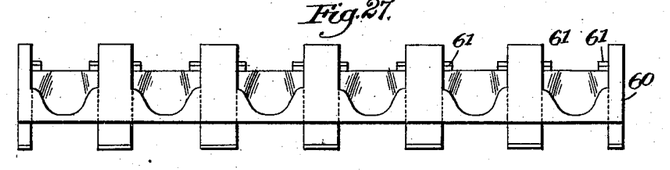
Fig. 27 shows one of the top plates 60.
Figure 28:
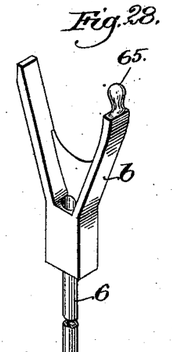
Fig. 28 shows one of the detachable mouths.

On the upper edges of the curbing 60 separating the pools from the sources referred to, are vertical prongs 61, shown best in Figs. 23, 24 and 27, against the rear side of which prongs the lifters leave the two ends of the nails about as the lifters complete their ascent, said lifters being, it will be understood, stopped when the bar 56, resting on the springs and being elevated by the spider, contacts with the carriages C, C', and thereafter as the spider continues to rise with the discharging devices $i$, the latter acting upwardly and laterally by reason of their beveled ends against the nail supported at its ends as described, causes the lighter end of the said nail to be lifted above one or the other of the said prongs 61, according to which one of said prongs the lighter or point end of the said nail was in contact with, and consequently the said nails as provided for in said patent, are unerringly directed point first into the sources, and by them conducted through the tubes described into the templets head up.

Desiring to elucidate the action of the lifters and discharging devices, I have in Fig. 23 shown at the extreme left as next the viewer one of the discharging devices $i$, and I have dotted behind it one of the lifters $h$, the discharging device being shown as in its highest position, it having on reaching that position discharged the nail, it will be supposed, carried up by the lifters over to the left into the source $b$ and that the said nail has gone down through the guide tube 6 into the mouth $g^8$ of the roadway $g^7$. Next in order to the right and at the right-hand side of the first set 24 I have shown as next the viewer one of the lifters $h$, and have omitted the discharging device, the section showing this particular set being such as to remove the discharging device. The third, fourth and sixth sets in succession are the same as the first, except that I have not shown the lifters in dotted lines, but in the fifth set I have shown only that one of the lifters against which the discharging device acts in its sliding movements.

Figure 25:
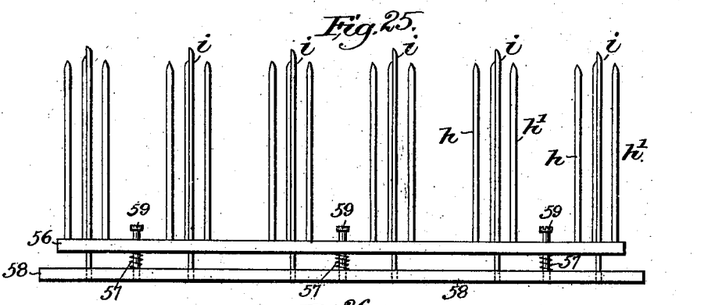
Fig. 25 shows one series of lifters and discharging devices.
Figure 26:
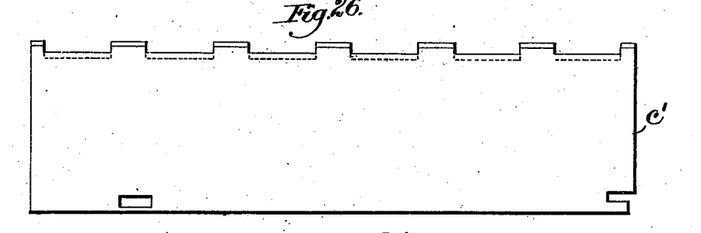
Fig. 26 shows one of the elevators $c'$ detached.

In practice and as represented herein, it will be understood that the bars 56, 58, carrying the lifting fingers grouped in sets of three and having a discharging device co-operating with the central lifting finger of the set, are supposed to be all alike, but they are put into the machine so that their ends alternate, those in one longitudinal row of lifting and discharging devices locating the discharging device say at the right, as represented in Fig. 25, whereas in the next row the discharging device will be at the left of the lifting finger with which it co-operates; or in other words, the discharging devices in alternate rows rise and fall on opposite sides of a vertical line drawn across the assorting mechanism and intersecting the line of junction of each discharging device with the finger with which it co-operates.

For convenience, I have made the sources $b$ detachable so that in case it is desired to fill a greater or less number of roadways or tubes or to fill some tubes and not others, the sources may be readily grasped by their handles 65 and be lifted from the bars $a'$, $a'$, and the holes left by the withdrawal of the tube be thereafter plugged or stopped in some suitable manner so as to prevent the further delivery of nails into the corresponding tubes $g^7$.

As stated, the cam shaft is stopped at the end of each complete rotation thereof, and the machine is stopped with the die carrier or plate nearly down and with the compressing mold fully down.

After the machine has been started by the hand lever $a^9$, the toggle link, &c., herein illustrated as operating the die carrier or plate,—will be gradually straightened, thus lifting the heel seat die until the blank properly supplied above it is lifted into position between the side pieces $b^9$, the upward movement of the heel seat die and blank stopping momentarily. At this point the levers, $b^7$, are made to move about their pivots and cause the side dies $b^9$ to firmly clasp the heel between them, after which the die carrier or plate carrying the heel seat die continues and completes its upward movement, thus strongly and powerfully compressing the heel blank. As the blank is thus compressed and consolidated, the awls if used are made to descend through the templet and prick a series of holes in the blank. As has before been stated, the upward movement of the die carrier or plate during the compressing operation resulted in causing that one of the bolts 3 or 4 which was underneath the side pieces $b^9$ to be pushed in and against the end of one of the levers 9 or 8, thus turning said lever and causing its impaling pins to be thrust into the heel blank.

Fig. 6 shows both sets of impaling pins in and acting to hold the heel blank.

Immediately after the awls have penetrated the heel blank, the heel seat die is slightly depressed, the side pieces $b^9$ being slightly open preparatory to withdrawing the awls, thus relieving the pressure of the stock upon the awls. The awls having been withdrawn, the die carrier or plate and heel seat dies complete their descent, during which operation the lever, let it be supposed in this instance, 8, strikes the projection at the upper end of the post E', as will be apparent from Fig. 6, thus turning said lever and withdrawing the impaling pins controlled by it from the heel blank at that time upon the heel seat die at the left in Fig. 6, but during this descent, the lever 9 will not be moved but will remain in position to retain its impaling pins in the compressed and pricked heel blank, so that as the die carrier or plate D' is given a semi-rotation the said impaling pins may retain the compressed and pricked blank in proper position to have its pricked holes come properly under the holes 93 referred to. Just before imparting to the die carrier or plate its semi-rotation above referred to, the die carrier or plate is elevated slightly, due to the shape of the cam N sufficiently to free the end of the lever 9 from the projection at the top of the post E', so that the said projection will not interfere with the said lever during the semi-rotation of the die carrier or plate.

From the foregoing it will be understood that the compressed and pricked heel blanks are brought in succession underneath the plate 92 and under the series of drivers, and it is while the awls are being withdrawn from the heel blank that the drivers are made to descend and act upon the heads of the nails in the nail boxes and it will be understood that after the drivers have driven the nails from the nail box into the pricked holes in the heel that the drivers continue to descend sufficiently while the die carrier or plate also descends to enable the nails to be driven by the drivers entirely out of the nail-box and the carrier 92 upon which the nail box is supported.

While the drivers are descending to drive a series of nails from the nail-box as described, another nail-box will occupy a position immediately under the foot $g^2$ with which the tubes $g^3$ are connected, and the mouths of the tubes $g^3$ will be in line with the holes 91 in the nail-box, and while in this position the spider will be elevated to cause the lifters to raise and the discharging device to discharge from them nails which will be delivered point first into the mouths and pass thence from the tubes into the holes in the nail-boxes. In this way, while one nail-box is in position to have the nails in it driven out by the drivers, another nail-box is in position to be loaded automatically and the loaded nail-boxes are brought in succession in line with and vertically above the pricked heel blanks which are brought in succession into position with relation to the loaded nail-boxes to have nails put into the pricked heels.

It will be understood that after the die carrier or plate D' has been lifted, as stated, and slightly elevated, the drivers having been lifted, the operator will engage the lever $E^3$ to let the belt $E^6$ start the Horton or other clutch $E^7$ and impart a semi-rotation to the shaft $A^{13}$ to thus partially rotate the nail box carrier and at the same time partially rotate, as stated, the die carrier or plate, and it will be remembered that this movement of the lever $E^3$ will also actuate the arm 47 to eject the loaded heel from the heel seat die, from which the impaling pins have just been withdrawn, and this partial rotation of the shaft $A^{13}$ having been effected, it will be stopped automatically by or through the clutch referred to, thus leaving the machine in all its parts in readiness to be again started by the lever $A^9$ to go through another cycle of operations.

The clutch $E^7$ is represented as a double clutch, and I will now describe the double or under part, it being instrumental in feeding the heel blanks to the heel seat dies. The loose collar of the under part is marked $t$, see Figs. 3 and $5^a$, and it has a lug $t'$ acted upon by a releasing lever $t^2$ fast on a shaft $t^3$ in a bearing $t^4$, the said shaft at its upper end having a second arm $t^5$, the outer end of which is normally kept by spring $t^7$ in range of movement of two studs or pins $t^6$ shown by dotted lines Fig. 5 at the under side of the locking plate $A^{15}$, the said pins acting in succession once during each half-revolution of said shaft $A^{13}$ to release the locking plate $t$ of the under clutch hereinafter designated as the heel blank feeding clutch, and enable the toothed part $t^8$ shown as a gear to be started with the constantly moving part of the clutch $E^7$, said gear $t^8$ engaging the gear $t^9$ on a shaft $t^{10}$ provided at its upper end with a crank or equivalent $t^{12}$ connected as shown best in Fig. 7, by a link $t^{13}$ to a heel blank feeder $t^{14}$, shaped to slide in a guide-way $t^{15}$ and above a plate $t^{16}$, the delivery end of which terminates in close proximity to the heel seat die before described. These parts, a heel blank having been laid on the table $t^{16}$, act to feed the said blank automatically into position on the heel seat die or support.

Referring to Fig. 7, it will be seen that the levers $b^7$ are pivoted near their ends and with such relation to the breast block 35, and that the side dies $b^9$ are so shaped that as they close upon the heel blank, they act to force the breast of the heel against the breast plate, thus giving definite shape and form to the heel breast.

In machines heretofore used for compressing heel blanks from side edge to side edge, the two-part dies acting against the sides of the heel as contradistinguished to its rear part, have been moved in planes approximately at right angles to the median line of the heel or a central line drawn from the breast to the rear of the heel; and it has also been proposed to divide the compressing dies into several sections, those acting on the rear of the heel near its center moving radially, while the sections which were to act on the sides of the heel blank near the breast moved in planes at right angles to said median line. In this present invention, however, the dies $b^9$, $b^9$, they contacting with the sides of the heel substantially to the breast corner of the blank, are moved in planes inclined to said median line and this particular direction of movement given to the dies with relation to the median line of the heel blank and the breast plate constitutes one of the important features of my invention, as thereby the pressure against the heel in compressing it is distributed therein in lines inclined to the median line of the heel from the rear of the heel to the breast. This particular movement of the side dies with relation to the breast in order to effect the shaping of the breast and rear of the heel is one of the essential features of this invention and has not, so far as I am aware, been previously practiced in a heel compressing machine, such movement dispensing with a three-part movable mold.

While it is preferred for power and simplicity to employ the toggle $d, d'$, yet this invention is not limited to the use of only such a device by which to raise and lower the movable bed $C^3$, and in the place of said toggle, I may use any other usual or known substitute or equivalent for raising and lowering the said bed.

It will be observed that pricking can be dispensed with without materially changing the function or operation of the other parts of the machine, and furthermore it is also obvious that the invention so far as it relates to the nail assorting and driving mechanism is not limited to a mechanism in which the heel is also compressed.

It is obvious that the construction of the several parts of the machine can be greatly varied without substantially changing or departing from the essential character and mode of operation of my invention.

In this my invention, the nail boxes are movable with relation to the roadways, not fixed, and there is a series of said nail boxes.

I claim—

1. In a machine for treating heels, a gang of drivers, and operating devices therefor; combined with a circularly movable table having a series of heel seat dies and a circularly movable table having a series of nail boxes, the centers of motions of said tables being at opposite sides the path in which the said drivers reciprocate, the said tables being also arranged in different horizontal planes or one above the other, whereby a loaded nail box may be interposed between the heel seat die containing a heel blank and the lower ends of the drivers, substantially as described.

2. In a machine for treating heels, a gang of drivers, and operating devices therefor; combined with a circularly movable table having a series of heel seat dies, and a circularly movable table having a series of nail boxes, the centers of motions of said tables being at opposite sides the path in which the said drivers reciprocate, the said tables being also arranged in different horizontal planes or one above the other, and with a heel compressing die and a nail presenting mechanism, substantially as described.

3. A machine to treat heel blanks, it containing the following instrumentalities, viz:— a separable mold to receive a heel blank to be compressed from side edge to side edge; devices to open and close said separable mold; a series of heel seat dies; and an intermittingly movable revolving carrier therefor to place one heel seat die after another in co-operative position with the said mold, substantially as described.

4. A machine to treat heel blanks, it containing the following instrumentalities, viz:— a separable mold to receive a heel blank to be compressed from side edge to side edge; devices to open and close said separable mold; a series of heel seat dies; an intermittingly movable revolving carrier therefor to place one heel seat die after another in co-operative position with the said mold; a series of nail boxes; an intermittingly movable carrier for said nail boxes; a nail presenting mechanism to supply said nail boxes in succession with nails; and a gang of drivers to drive the nails from one of the said series of nail boxes into a heel resting on one of the said heel seat dies then under it, whereby one heel blank may be compressed at one point, and another be loaded with nails at another point, and an empty nail box be supplied with nails at yet another point, substantially as described.

5. A machine to treat heel blanks, it containing the following instrumentalities, viz:—a rotatable series of heel seat dies, a compressing mold with which they co-operate, an awl plate having a gang of awls to prick the compressed blank; a templet to guide said awls; a series of nail boxes independent of the templet; a gang of drivers to drive the nails from one of the nail boxes into the pricked heel, and nail presenting mechanism to automatically and successively provide the nail boxes with nails, and actuating mechanism for said mold, awls, dies, nail boxes and drivers, whereby a heel may be compressed and pricked at one point, a pricked heel may be loaded with nails at another point, and an empty nail box be supplied with nails at another point, substantially as described.

6. A series of vertically movable heel seat dies, and a yielding abutment between which the heel is compressed vertically and an edge compressing mold with which said dies co-operate in succession, combined with actuating means to impart to the series of heel seat dies a step by step movement to bring one die after another into position to have the heel blank laid upon it and then to place said blank within the said compressing mold, substantially as described.

7. A vertically movable bed; a rotatable die carrier mounted thereon and provided with a series of heel seat dies; and a separable mold and yielding abutment detached from said bed, combined with a series of levers, and co-operating impaling pins adapted to be actuated by said levers, and a device to actuate one of the said levers at one descent of the said bed, and the other at a subsequent descent thereof to thus withdraw in succession the impaling pins, substantially as described.

8. A heel compressing mold, a rotatable die plate provided with a series of heel seat dies; a series of levers, one for each die, impaling pins adapted to be actuated by the said levers, devices to actuate said levers in succession preparatory to or while compressing the heel to thus thrust the impaling pins into the heel blank preparatory to feeding the same, and devices to move the series of heel seat dies intermittingly, substantially as described.

9. In a machine for treating heel blanks, a pair of die or jaw-carrying levers having die cavities diverging toward the breast of the die, and a pair of compressing dies shaped externally to conform to the sides of the die cavity, whereby the strain exerted on the dies by the said carrying levers while compressing the heel blank is applied in the direction to maintain the dies in place and obviate outward slipping thereof on the said levers, substantially as described.

10. In a machine for treating heels, the following instrumentalities, viz:—a heel support; a breast plate, a two-part compressing die, each part adapted to act on the heel from its rear part substantially to its breast corner, and actuating devices therefor, whereby movement is imparted to the side compressors in a direction diagonal to a vertical plane drawn centrally through the heel from its rear part to the center of its breast, substantially as described.

11. In a machine for treating heels, a heel seat die, a support therefor, and a breast-plate to sustain the breast of the heel blank, combined with side compressing dies adapted to act on the heel from its rear part substantially to its breast corners, and their carrying levers $b^7$; mounted on vertical pivots beyond the rear side of the breast-plate, and actuating devices for said levers whereby movement is imparted to the said side compressing dies in a direction diagonal to a vertical plane drawn centrally through the heel from its rear part to the center of its breast, substantially as described.

12. In a machine for treating heels, the following instrumentalities, viz:—a series of vertically movable heel seat dies, and a yielding abutment between which the heel is compressed vertically, and an edge compressing mold with which the heel seat dies co-operate in succession; and devices for actuating the die carrier or plate and closing the compressing mold in time and order, substantially as described, whereby the heel seat die is first operated to effect the placing of the blank in the open compressing mold, the compressing mold is then closed, the continued vertical movement of said die carrier or plate resulting in the completion of the compression of the heel blank.

13. In a machine for treating heels, the rotating shaft $A^4$ having a crank pin; an awl-slide; an awl-plate having a gang of awls; connections between the said crank pin and awl slide; a secondary crank pin carried by the said shaft; and a driver bar having an irregular cam groove; combined with a gang of drivers, substantially as described.

14. In a machine for treating heels; a driver bar composed of two parts, one of which is made laterally movable with relation to the other; and a driver plate also made laterally movable with relation to the driver-bar; and a gang of drivers carried by the driver plate; combined with a nail box having a series of holes to operate, substantially as described.

15. A driver-bar; and a co-operating driver-plate having a series of drivers; and a nail box actuator, combined with a nail box having a hole to be entered by the said actuator; and a carrier for the said nail-box, the nail box actuator effecting the registration of the holes in the nail-box with the holes in the nail-box carrier and with the path of movement of the drivers, substantially as described.

16. A driver-bar; and a co-operating driver plate having a series of drivers; and a nail-box actuator; combined with a nail-box having a hole to be entered by the said actuator; and a support or carrier for the said nail-box, the nail box actuator effecting the registration of the holes in the nail box with the holes in the said carrier and with the path of movement of the drivers; and with a spring to restore the nail box into its normal position thereby enabling the nails in the loaded nail box to be retained in position until they are driven out therefrom by the driver, substantially as described.

17. In a machine for treating heel blanks, a compressing mold composed of edge compressors made movable one toward the other, and having a co-operating stationary breast plate beveled at the entering end of the mold, combined with a movable heel seat die adapted to force the heel blank into the mold, and with devices to close the side edge compressing mold, substantially as described.

18. A machine for treating heels, it containing the following instrumentalities, viz:—nail-assorting mechanism; an awl-carrying bar; and intermediate connections between the said awl-carrying bar and nail assorting mechanism whereby the assorting mechanism is operated at proper times with relation to the movements of the awl bar, substantially as described.

19. In a machine for treating heel blanks a pair of compressing jaws adapted to substantially surround the heel to the breast carrier, combined with carriers therefor pivoted beyond the breast plate and adapted to move said jaws diagonally toward the breast plate whereby the acting faces of said jaws are made to resist the outward as well as the lateral thrust on said carriers of said jaws, substantially as described.

20. A series of lifters, and a series of nail discharging devices; a series of fixed tubes as $g^7$, into which the said nails are delivered; combined with an independent detachable series of tubes $g^3$; and a stand for supporting the tubes $g^3$ independently of the tubes $g^7$ and the parts holding them, substantially as described.

21. A heel blank compressing mold and a sidewise movable heel support, combined with one or more impaling pins carried by said heel support, and actuating mechanism for said support and pins, substantially as described.

22. A heel compressing mold and a series of heel supports, and one or more impaling pins carried by and co-operating with each of said supports, and actuating mechanism for said supports and pins, substantially as described.

23. In a machine for treating heels, nail assorting devices; nail presenting mechanism composed of a series of stationary and co-operating series of removable tubes; an independent support for the series of removable tubes; a spindle located at one side of the lower end of the removable series of tubes; a nail box carrier connected therewith; a series of nail boxes mounted on said carrier, and devices to actuate both the nail assorting device and to actuate the spindle to bring the said nail boxes in succession under the ends of the removable series of tubes, substantially as described.

24. The shaft $A^{13}$; the rotatory nail box carrier connected to its upper end, and a gear $D^2$ on said shaft below said carrier; and a series of nail boxes mounted on said carrier; combined with a rotatory die carrier or plate having teeth to be engaged by gear $D^2$, and with a series of heel seat dies, substantially as described.

25. The shaft $A^{13}$; the circularly movable nail-box carrier connected to its upper end, and a gear $D^2$ on said shaft below said carrier; and a series of nail boxes mounted on said carrier, combined with a circularly movable die carrier or plate having teeth to be engaged by the gear $D^2$, a series of heel seat dies, and a separable mold, substantially as described.

26. In a machine for treating heels, the following instrumentalities, viz:—a two-part side edge compressing-mold; a heel blank support; heel blank pricking awls, and a heel blank feeder to feed a heel blank into position to be put into the said mold, substantially as described.

27. A movable carrier having a series of heel seat dies; an edge compressing mold; a heel blank feeder, and a clutch mechanism and intermediate devices to actuate the said carrier and feeder intermittingly, substantially as described.

28. In a machine for treating heels, the following instrumentalities, viz:—nail assorting mechanism and nail presenting mechanism including a series of tubes terminating in a foot provided with a series of holes for the discharge of nails, a rotatable table having a series of nail boxes, devices to operate said table and bring said nail boxes in succession under the said tubes, a series of heel seat dies adapted to carry heels to be loaded with nails from the said nail boxes, nail drivers, a reciprocating plunger and devices intermediate the plunger and the nail assorting mechanism to automatically operate the nail assorting mechanism, for the purposes set forth.

29. In a machine for treating heels, a gang of drivers, and operating devices therefor; combined with a circularly movable table having a series of heel seat dies and a circularly movable table having a series of nail boxes, the centers of motions of said tables being at opposite sides the path in which the said drivers reciprocate, the said tables being also arranged in different horizontal planes or one above the other; nail assorting mechanism; nail presenting mechanism; and devices to actuate the nail assorting mechanism, whereby a nail box may be automatically loaded with nails and a loaded nail box may be interposed between the heel seat die containing a heel blank and the lower ends of the drivers, substantially as described.

30. In a machine for treating heels, a gang of drivers, and operating devices therefor; combined with a circularly movable table having a series of heel seat dies and a circularly movable table having a series of nail boxes, the centers of motions of said tables being at opposite sides the path in which the said drivers reciprocate, the said tables being also arranged in different horizontal planes or one above the other; nail assorting mechanism; and devices to actuate the nail assorting mechanism, whereby a nail box may be automatically loaded with nails and a loaded nail box may be interposed between the heel seat die containing a heel blank and the lower ends of the drivers, substantially as described.

In testimony whereof I have signed my name to this specification in the presence of two subscribing witnesses.

CHARLES W. GLIDDEN.

Witnesses:
H. P. FAIRFIELD,
E. B. STAPLES.